United States Patent

[11] 3,540,480

| [72] | Inventors | Kurt W. Leibfritz<br>Norridge;<br>Lester W. Malinowski, Des Plaines, Illinois |
|---|---|---|
| [21] | Appl. No. | 735,305 |
| [22] | Filed | June 7, 1968 |
| [45] | Patented | Nov. 17, 1970 |
| [73] | Assignee | Parker-Hannifin Corporation<br>Cleveland, Ohio<br>a corporation of Ohio |

[54] MANUAL CONTROL FOR SOLENOID VALVE
6 Claims, 2 Drawing Figs.

[52] U.S. Cl. ............................................. 137/625.6
[51] Int. Cl. ............................................. F16k 11/07, F16k 31/04
[50] Field of Search ............................................. 251/26; 137/625.64

[56] References Cited
UNITED STATES PATENTS

| 2,664,916 | 1/1954 | Conley | 251/26 |
| 2,993,510 | 7/1961 | Collins | 137/625.64 |
| 3,126,915 | 3/1964 | Hunt | 137/625.64X |
| 3,253,516 | 5/1966 | Huntington et al. | 137/625.64X |
| 3,269,417 | 8/1966 | Lansky et al. | 137/625.64 |

*Primary Examiner*—Henry T. Klinksiek
*Attorney*—Oberlin, Maky, Donnelly & Renner ABSTRACT: A manual control arrangement for a solenoid pilot operated main valve that enables fluid pressure actuation of the main valve without operation of the solenoid pilot valve by bypassing pilot pressure fluid around the solenoid pilot valve for actuating the main valve.

Patented Nov. 17, 1970

3,540,480

INVENTORS
KURT W. LEIBFRITZ
LESTER W. MALINOWSKI

BY
Oberlin, Maky, Donnelly & Renner
ATTORNEYS 3,540,480

MANUAL CONTROL FOR SOLENOID VALVE

BACKGROUND OF THE INVENTION SUMMARY OF THE INVENTION

This invention relates to solenoid operated pilot controlled main valves in which a main valve for directing a large flow of fluid to a motor is controlled by a solenoid operated pilot valve that directs a small flow of fluid to or from pressure responsive surfaces on the main valve to cause shifting of the latter to its various positions. In such valves it is common practice to provide a manually controlled means for actuating the pilot valve in case of either electrical failure or on occasions when electrical operation is undesirable, as when adjusting the fluid motor controlled by the main valve. However, it sometimes happens that the pilot valve has become damaged or jammed so as not to be manually operable.

Summary of the Invention

The present invention provides a separate manually operable pilot valve that is completely independent of the solenoid operated pilot valve and in which high-pressure pilot fluid controlled by the solenoid pilot valve for actuating the main valve does not go through the manual pilot valve and vice versa whereby either pilot valve can direct pressure fluid to the main valve independently of the other pilot valve.

It is another object of this invention to provide a manual pilot valve which is of simple form and which is operated simply by pushing the same in against a biasing spring and turning it a part revolution if it be desired to latch the same in its solenoid override position. Such latching also makes possible the keeping of the main valve in its fluid pressure actuated position for long periods of time without maintaining the solenoid in energized condition.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

DESCRIPTION

Figure 1:
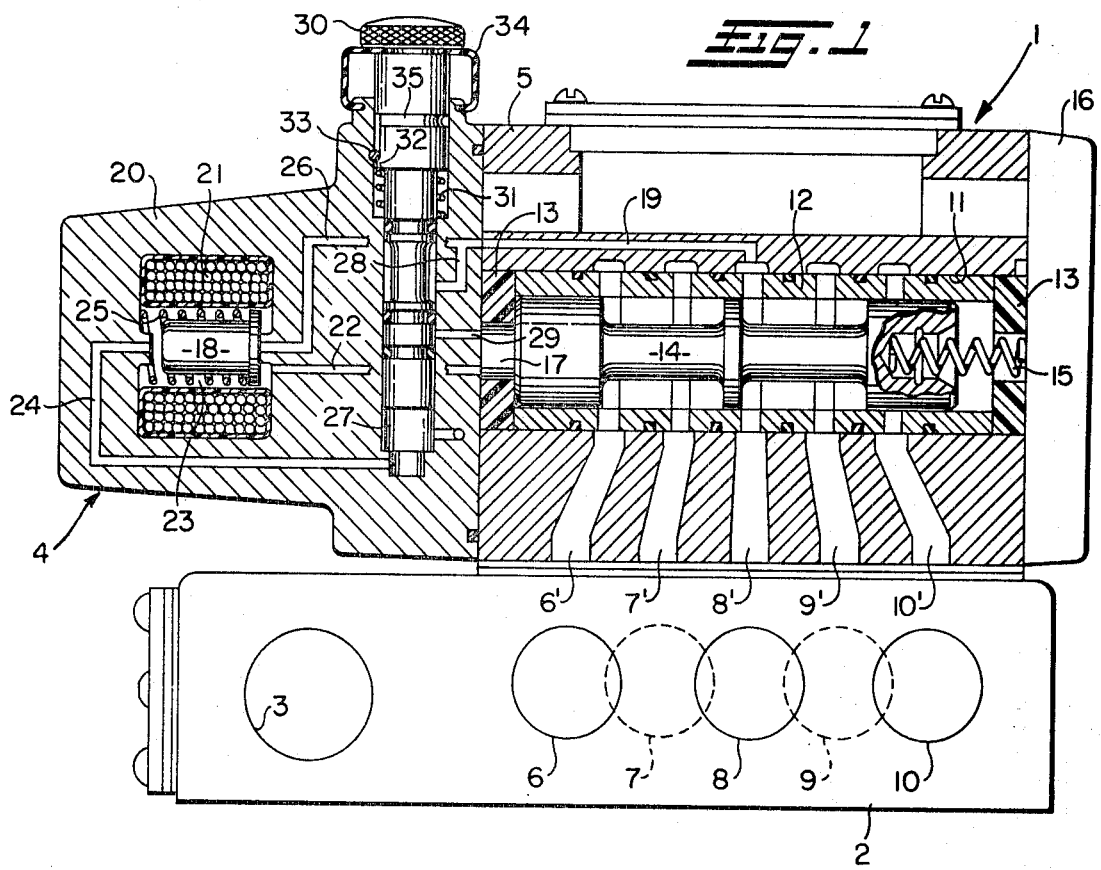
FIG. 1 is a cross-sectional view of a pilot operated valve assembly that illustrates the manual pilot valve in its normally inoperative position.

The solenoid operated valve assembly 1 herein shown by way of illustrative example, comprises a distributing block 2 having an electric cable or conduit connection port 3 through which leads may be brought for passage through valve block 5 for connection to solenoid pilot valve assembly 4.

In the present case, the distributing block 2 has five ports 6, 7, 8, 9, and 10, which communicate with the respective passages 6', 7', 8', 9' and 10' in the valve block 5. When the valve 1 is used as a dual exhaust valve, the ports 6 and 10 are exhaust ports and the center port is the pressure inlet port and the two ports 7 and 9 on the rear side of the distributing block 2 are motor ports connected to opposite ends of a double acting fluid motor. On the other hand, when the valve 1 is of the dual pressure type the two ports 6 and 10 are pressure ports and the center port 8 is the exhaust port, whereby a double acting fluid motor connected with the ports 7 and 9 may be actuated in opposite directions from two pressure sources of equal or unequal magnitude.

The valve block 5 has a central through bore 11 which is preferably of uniform diameter from end to end and which intersects all five of the aforesaid passages 6' to 10'. Within said bore is a packed liner sleeve 12 which is slotted as shown to register with the respective passages 6' to 10', the sleeve 12 being held in axially centered position by means of the bumper rings 13 which preferably are approximately flush with the plane ends of the valve block 5 when the sleeve 12 is assembled therebetween.

Reciprocable within the liner sleeve 12 is a valve spool 14 which for purposes of illustration, is of the two-position spring return type wherein a spring 15 is compressed between one end of the spool 14 and the cap 16 secured to one end of the valve block 5, said spring 15 being operative to urge the spool 14 toward the left into engagement with the left bumper ring 13 when the chamber 17 at the end of the spool is vented through the pilot valve 18. In that position of the spool 14 fluid under pressure in the pressure inlet port 8 will flow through the passages 8' and 9' to the motor port 9 to actuate the fluid motor in one direction and returning fluid from the motor will be exhausted through the other motor port 7, passages 7' and 6' to the exhaust port 6.

When fluid under pressure is admitted into the chamber 17, the spool 14 will be actuated to the right until its right end engages the right bumper ring 13 and at that time the pressure inlet port 8 and pressure inlet passage 8' will be communicated with the passage 7' and motor port 7 to actuate the fluid motor in the opposite direction with returning fluid from the motor flowing through motor port 9 and through passages 9' and 10' to the exhaust port 10.

To effect movement of the spool 14 in the manner indicated above, the valve block 5 has a pressure supply passage 19 leading from the pressure inlet passage 8' through the left end of the valve block 5. A pilot valve housing 20 having a solenoid 21 therein is attached to the valve block 5 and the solenoid pilot valve 18 constitutes the solenoid armature. When the solenoid pilot valve 18 is in the position shown (solenoid 21 deenergized) it vents the chamber 17 through passage 22, passage 23 around pilot valve 18, and the then open exhaust or vent passage 24. At that time, the pilot valve 18 is biased by spring 25 to close the pressure supply passage 26 which registers with pressure supply passage 19.

When the solenoid 21 is energized, the pilot valve 18 is pulled to the left to close the exhaust passage 24 and to open the pressure passage 26 which registers with the pressure supply passage 19 in the valve block 5 thus to conduct fluid under pressure into the chamber 17 via the passage 22 in the pilot valve housing 20. Thus, the fluid pressure in the chamber 17 acting on the left-hand end of the spool 14 moves it toward the right against the right bumper ring 13.

In the event of electrical power failure, or in the event electrical operation is not desired, spring 25 causes pilot valve 18 to close pilot pressure passage 26 and opens exhaust passage 24. To provide for spool actuation under those conditions the pilot valve housing 20 has therein a transverse bore 27 which intersects the exhaust passage 24 downstream of the pilot valve 18 and which has passages 28 and 29 leading to said bore 27 from the pressure supply passage 26 upstream of solenoid pilot valve 18 and from the chamber 17.

Movable in said bore 27 is a manually operable pilot valve member 30 which is biased by the spring 31 to its inoperative position whereat the exhaust passage 24 is open and communication between the passages 28 and 29 is blocked. This position of valve member 30 is determined by the engagement of the stop shoulder 32 thereof with the stop pin 33. If desired, a flexible boot 34 may be provided to prevent dirt from getting into the valve mechanism.

Figure 2:
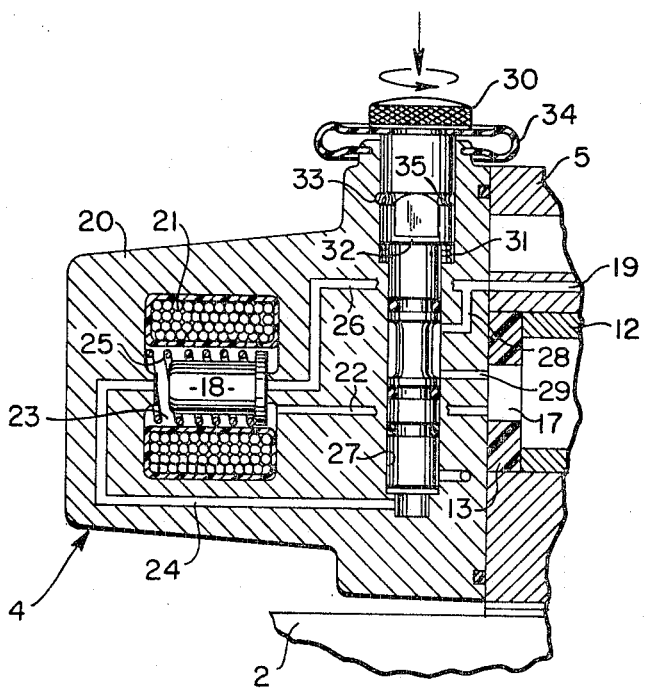
FIG. 2 is a fragmentary cross-sectional view showing the manual pilot valve in its operating position to achieve fluid pressure actuation of the main valve independently of the solenoid pilot valve.

As shown in FIG. 2, when the manual pilot valve member 30 is pushed downwardly and turned, the pin 33 is engaged in a groove 35 to latch said member 30 in depressed position. In the depressed position of member 30 (whether turned or not) the exhaust passage 24 is closed thereby and communication is opened between the passages 28 and 29, whereby fluid under pressure from passages 19 and 26 flows into the chamber 17 to move the spool 14 toward the right. When the member 30 is released, the spring 31 moves it to the FIG. 1 position to close communication between the pressure supply passage 28 and the passage 29 leading into the chamber 17 and the exhaust passage 24 is again opened so that the chamber 17 may be exhausted through the passages 22, 23, and 24.

The portion of the exhaust passage 24 downstream of bore 27 may extend directly to the atmosphere through the pilot valve housing 20 or, if desired, this end of the exhaust passage 24 may register with a passage in the valve block 5 leading to the exhaust passage 6'.

Thus pilot pressure fluid from passage 19 may be directed to chamber 17 for shifting spool 14 either through passage 26 around manual pilot valve 30 to solenoid pilot valve 18 or through passage 28 around solenoid valve 18 to manual valve 30.

When the valve assembly 1 is used as, for example, in a vacuum system, or in a low-pressure system, in which the fluid pressure is insufficient to actuate the valve spool 14, a remote source of pilot pressure may be connected to passages 26 and 28 in lieu of the passage 19.

We claim:

1. In a pilot operated valve of the type wherein a valve housing has a solenoid operated pilot valve therein which, upon energization and deenergization of the solenoid, alternately communicates a fluid pressure supply passage in said housing with a chamber in said housing to which a main valve is exposed for fluid pressure actuation of the latter in one direction in said housing and communicates said chamber with a vent passage in said housing to permit return movement of said main valve, the improvement which comprises a manually operated pilot valve movable in said housing from a first position wherein said vent passage is open downstream of said solenoid pilot valve to a second position wherein said downstream portion of said vent passage is closed and wherein said chamber is communicated with said pressure supply passage upstream of said solenoid pilot valve whereby in said second position, said main valve may be fluid pressure actuated without energization of said solenoid; said housing having passage means from said supply passage to said chamber which is opened by said manual pilot valve when in said second position to direct fluid from the supply passage to said chamber without passing through said solenoid operated pilot valve.

2. The valve of claim 1 wherein said housing has a bore intersected by said passage means, said passage means comprising two passages respectively leading to said pressure supply passage and to said chamber; said manual pilot valve being movable in said bore and being operative in said first and second positions to close and open communication between said two passages.

3. A valve assembly comprising a valve housing having a plurality of fluid flow passages; a main valve spool reciprocable in said body to control flow of fluid through selected passages; a solenoid operated pilot valve in said housing; said pilot valve comprising a pilot valve member which, upon energization and deenergization of the solenoid thereof, is movable in said solenoid to alternately communicate a chamber in said housing to which said valve spool is exposed for fluid pressure actuation with a pressure supply passage and with a vent passage in said housing; and a manually operated pilot valve movable in said housing from a first position wherein said vent passage is open downstream of said solenoid pilot valve member to a second position wherein said vent passage is closed downstream of said solenoid pilot valve member and wherein said chamber is communicated with said pressure supply passage upstream of said solenoid pilot valve whereby in said second position said main valve spool may be actuated by fluid pressure in said chamber without energization of said solenoid; said housing having passage means from said supply passage to said chamber which is opened by said manual pilot valve when in said second position to direct fluid from the supply passage to said chamber without passing through said solenoid operated pilot valve.

4. The valve assembly of claim 3 wherein said housing has a bore intersected by said passage means, said passage means comprising two passages respectively leading to said pressure supply passage and to said chamber; said manual pilot valve being movable in said bore and being operative in said first and second positions to close and open communication between said two passages.

5. A pilot operated valve assembly comprising a distributing block having pressure inlet, exhaust, and motor ports; a valve block secured to said distributing block and having passages communicating with the respective ports; said valve block having a bore intersecting said passages; a valve spool reciprocable in said bore to selectively communicate a motor port with said inlet port or said exhaust port thus to control actuating of a fluid motor; a solenoid operated pilot valve assembly comprising a housing secured to one end of said valve block adjacent the corresponding end of said bore and said valve spool to form therewith a chamber for fluid pressure actuation of said valve spool; a solenoid in said housing; a solenoid armature movable in said solenoid upon energization and deenergization of said solenoid and constituting a pilot valve member; said valve block and said housing having registering fluid pressure supply passages of which the passage in said valve block communicates with said inlet passage and of which the passage in said housing terminates in a seat adjacent one end of said pilot valve member; said housing having a vent passage terminating in a seat adjacent the other end of said pilot valve member; said housing having a connecting passage leading from a space between said seats to said chamber; spring means biasing said pilot valve member into engagement with said pressure supply passage seat and out of engagement with said vent passage seat when said solenoid is deenergized whereby said chamber is vented via said connecting passage, said space and said vent passage; said pilot valve member, upon energization of said solenoid, being moved into engagement with said vent passage seat and out of engagement with said pressure supply passage seat whereby fluid under pressure is conducted to said chamber via said pressure supply passage, said space, and said connecting passage to actuate said valve spool; said housing having a bore intersecting said vent passage downstream of said vent passage seat, a branch pressure supply passage leading to said bore from said pressure supply passage upstream of said pressure supply passage seat, a second connecting passage leading to said bore from said chamber; and a manually operated pilot valve movable in said housing bore from a first position wherein said vent passage is open downstream of the seat thereof and communication between said branch and second connecting passage is blocked by said manual pilot valve to a second position wherein said vent passage is blocked by said manual pilot valve and said branch and second connecting passages are in fluid communication whereby fluid under pressure is conducted to said chamber to actuate said valve spool without energization of said solenoid, and without fluid passage through said solenoid operated pilot valve.

6. In a pilot operated valve of the type wherein a valve housing has a solenoid operated pilot valve therein which, upon energization and deenergization of the solenoid, alternately communicates a fluid pressure supply passage in said housing with a chamber in said housing to which the main valve is exposed for fluid pressure actuation of the latter in one direction in said housing and communicates said chamber with a vent passage in said housing to permit return movement of said main valve, the improvement comprising a manually operable pilot valve independent of the solenoid operated pilot valve, and passage means from said supply passage to said chamber via each pilot valve whereby each of said pilot valves can direct fluid from said pressure supply passage to said chamber without passing the fluid through the other of said pilot valves.